US007468479B2

(12) United States Patent
Kraus

(10) Patent No.: US 7,468,479 B2
(45) Date of Patent: Dec. 23, 2008

(54) MUSICAL INSTRUMENT PAD

(76) Inventor: Edward Otto Kraus, P.O. Box 22205, Milwaukie, OR (US) 97269-2205

(*) Notice: Subject to any disclaimer, the term of this patent is extended or adjusted under 35 U.S.C. 154(b) by 326 days.

(21) Appl. No.: 11/113,287

(22) Filed: Apr. 21, 2005

(65) Prior Publication Data

US 2005/0235807 A1 Oct. 27, 2005

Related U.S. Application Data

(60) Provisional application No. 60/564,812, filed on Apr. 22, 2004.

(51) Int. Cl.
*G01D 7/08* (2006.01)

(52) U.S. Cl. .................................................... 84/385 P

(58) Field of Classification Search ............... 85/385 A, 85/385 R, 385 P See application file for complete search history.

(56) References Cited

U.S. PATENT DOCUMENTS

| | | | | |
|---|---|---|---|---|
| 2,759,386 | A * | 8/1956 | Pascucci | 84/385 R |
| 3,421,399 | A | 1/1969 | Greenleaf | |
| 3,958,484 | A | 5/1976 | Nelson | |
| 4,114,500 | A | 9/1978 | Norbeck | |
| 4,453,444 | A | 6/1984 | Valentino | |
| 4,704,939 | A | 11/1987 | Straubinger | |
| 5,417,135 | A | 5/1995 | Straubinger | |
| 5,469,771 | A | 11/1995 | Wasser | |
| 6,028,256 | A * | 2/2000 | Straubinger | 84/385 P |
| 2004/0129128 | A1 | 7/2004 | Shibamiya | |

FOREIGN PATENT DOCUMENTS

FR 2703178 A1 * 9/1994

OTHER PUBLICATIONS

Eddie Ashton, description of "superpads" www.woodwindco.com/superpads.htm.

* cited by examiner

*Primary Examiner*—Briggitte R Hammond

(57) ABSTRACT

The proposed solution to problems associated with pad leveling and effective tone hole closure, employs a pad with a beveled backer that is relatively rigid, and an adjoining contact layer that seals a corresponding tone hole when a musical instrument key is actuated. In one embodiment, the backer features a sloping side wall, and optionally a side wall portion having a curved contour. Leveling of the pad is accomplished by placing the backer partially within a pad cup, adjusting the pad orientation while maintaining sliding contact between the backer and the pad cup, and fixing the pad within the pad cup. The backer is preferably shaped to provide support to all portions of the contact layer. Another embodiment features a step-bevel backer that is sized to fit a pad cup, and preferably supports all portions of an adjoining contact layer whose diameter exceeds that of the pad cup.

17 Claims, 23 Drawing Sheets

MUSICAL INSTRUMENT PAD

CROSS REFERENCE TO RELATED APPLICATIONS

This application claims the benefit of the filing date of U.S. provisional application No. 60/564,812, filed on Apr. 22, 2004, Inventor Edward O. Kraus.

BACKGROUND OF THE INVENTION

1. Field of the Invention

This invention relates generally to musical instruments, and more particularly to a musical instrument pad suitable for use in musical instruments.

2. Description of the Related Art

A pad is used for closing a tone hole on a woodwind musical instrument, including but not limited to a piccolo, flute, clarinet, saxophone, oboe, or bassoon. A pad contains a sealing surface, which is placed in contact with a corresponding tone hole when it is desired to close the tone hole. A pad is typically circularly symmetric about an axis normal to the sealing surface of the pad.

A pad is typically attached to a pad cup (a pad cup is also called "key cup" herein) of a musical instrument. The pad cup is typically situated at one end of a key mechanism. The key mechanism ("key" herein) may be actuated by a player of a musical instrument, and functions to open and close one or more tone holes located within the length of the musical instrument, which results in a change of pitch of the note being produced. The pad's position is usually fixed within the pad cup through the use of a pad adhesive, or by mechanical means involving any combination of screws, snaps, nuts, washers, and press-fit rings (also called grommets). When an adhesive is used to fix the pad in the pad cup, the process of positioning the pad, by heating the adhesive and adjusting the pad position relative to the pad cup, is known as "floating" the pad.

An effective pad has the following characteristics: a) it opens and closes a corresponding tone hole, typically as a result of light finger pressure or spring tension placed on the key; b) it produces as little noise as possible when contacting the tone hole; c) when in closed position, it makes a reliable and repeatable air-tight seal between the pad's sealing surface and the corresponding tone hole, preventing air (whose pressure is slightly higher than ambient air pressure) in the interior of the instrument ("bore" herein) from escaping through the tone hole.

When closing a tone hole, the position of the sealing surface of a pad relative to the tone hole is critical. In practice, any one or a combination of the following mechanical characteristics inherent in woodwind instrument key design may cause problems in sealing:

- the pad cup moves in an arcuate motion about a center pivot point of the key, which is mounted on a small screw or small hinge rod;
- the key is a complicated assembly of many parts brazed together that may have assembly tolerance positional errors, or may be in a bent or damaged condition. Positional errors may include translational error in three axes, and rotational error around two axes. (Because a pad is typically circular and symmetric about a centerline normal to the pad sealing surface, rotation about the vertical axis of a tone hole during installation does not affect pad effectiveness). Typically a pad is tolerant of some translational position error with respect to the tone hole, so long as the sealing surface of the pad remains level with the tone hole. By manipulating the pad orientation (known herein as "leveling"), through e.g., tipping of the pad within the pad cup, small errors may be corrected. When the pad has been positioned properly within its pad cup, it is said to be "leveled" with respect to the tone hole that it closes.

For a pad to function properly, the pad must contact a tone hole with a light and uniform compression around a circle formed by the intersection of the top of the tone hole ("tone hole edge" herein) and a plane defined by an outer surface of the pad (known as "the sealing surface"), such that every portion of the tone hole edge is in contact with the pad. In order to produce an air-tight seal when a key is in the closed position, it is crucial that the sealing surface of the pad be at the proper height, and in the same plane as the tone hole edge. Adjusting a pad to effectively seal a tone hole is typically more difficult to achieve if the diameter of the pad cup is very nearly the same as the diameter of the tone hole (rather than the pad diameter being larger than the diameter of the tone hole) because there is a smaller tolerance for positional error.

If the key is in alignment with the tone hole, then it is typically easy to install and level a pad. In practice however, perfect alignment of key and tone hole is rarely the case, and labor necessary to achieve perfect pad alignment may be costly.

To cope with some alignment problems, several practices known in the art have developed. Adjustment of the pad's position may be accomplished by one or more of the following methods: selecting a thicker or thinner pad; floating the pad on a molten bed of pad adhesive (typically a hot melt glue) which is cooled to solidification after the part is in position; bending the key to change its position with respect to the tone hole; or adjusting the position of the pad through the use of thin paper shims placed between the back of the pad and the inside of the key cup. If heat sensitive pad adhesive is used for pad installation, once the pad is initially placed in the pad cup, a combination of light pressure and gentle warming can be used to adjust the pad so that the sealing surface of the pad conforms to the tone hole. A properly installed pad will have a small circular impression (pad seat) that is typically between 0.010 and 0.020 inches deep within the sealing surface of the pad. To create a pad seat, either a cushion layer or an outer sealing layer of the pad is slightly deformed. Seating is accomplished when every portion of the tone hole edge is in contact with the pad, and there is uniform contact pressure around the entire circumference of the pad seat.

It is crucial that pads be adjusted to be level, i.e., parallel to the plane of the corresponding tone hole edge prior to seating. A pad that is not leveled before seating will result in an unequal depth of impression, i.e., unequal compression around the circumference of the pad seat. Unequal compression of the pad materials does not remain stable over time. Due to elastic memory of the materials, regions of greater compression will tend to regain their original thickness, causing gaps between the pad seat and the edge of the tone hole over time, and consequent air leaks.

Prior art includes a non-beveled pad, a cross-section of which is shown in FIG. 1, and which may be assembled from straight-sided, die cut sheet materials (cork, silicone rubber, paper, cardboard, various polymer foams, and various pressure-sensitive adhesives) or from die cut laminated sheets of various combinations of sheet materials. A typical prior art non-beveled pad 10 as shown in FIG. 1 has a backer 120 (a backer is also called a backing layer herein) which is typically made of paper or cardboard, a cushion layer 140, a sealing layer 160, and a straight side wall 180 perpendicular to a plane defined by sealing surface 190. Typically, all layers, i.e., backer, cushion layer and sealing layer, are cut to a same diameter 122.

Problems with prior art non-beveled pads, such as that depicted in FIG. 1, may include difficulty controlling the final firmness of the pads, poor sealing characteristics of some materials, and heat sensitivity of some foam materials. Each of these problems may contribute to failure of the pad to seal properly after installation. Heat sensitivity (e.g., low melting temperature, propensity to deform upon heating) polymer foams is particularly problematic, often resulting in pad failure when a hot melt adhesive is used for installation.

FIG. 2 shows a cross-sectional view of a pad cup 210 and corresponding tone hole 220 prior to pad installation. A non-beveled pad is relatively easy to construct, but difficult to install correctly into a pad cup. Several problems can arise from the choice of a non-beveled pad. First, a non-beveled pad must fit entirely within pad cup inside diameter 230, and therefore the pad's diameter cannot exceed key cup inside diameter 230. Problems can arise if tone hole diameter 240 is approximately the same as pad cup inside diameter 230, because a non-beveled pad, e.g. pad 10 will typically meet tone hole edge 250 at the pad's outermost edge. As is known by those skilled in the art, a pad seat situated on the extreme outer edge of a pad makes a poor seal when attempting to close a tone hole. Second, as seen in FIG. 3, if a non-beveled pad 10 closely fits inside pad cup 210, pad side wall 180 tends to self-align with pad cup inside edge 340, which prevents making small adjustments, both in translation and rotation, of pad 10. Thus for a non-beveled pad, it is difficult to correct a misalignment of pad cup 210 with tone hole edge 250. Misalignment causes pad sealing surface 190 to be non-parallel to a plane defined by tone hole edge 250, resulting in air leakage when closing the tone hole 220 with pad 10.

Prior art also includes a traditional beveled pad 40, as shown in FIG. 4, made with multiple layers including: backer 420 containing one or more disks (typically made of cardboard) for stiffening; cushion layer 440 containing one or more disks typically made of wool felt, for cushioning an impact due to contact with a tone hole, and for reduction of noise; and membrane 460 typically made of bladder or leather, wrapped around the assembly and glued to backer 420, which membrane forms sealing surface 480 to make an air-tight seal with a tone hole. Traditional beveled pad 40 has its backer 420 cut to a smaller diameter 418 than diameter 422 of cushioning layer 440 that it supports. A beveled pad 40 having backer vertical side wall 424 and cushion layer side wall 448 is commonly called a "step-bevel" pad Beveled pad 40 has two distinct advantages over non-beveled pad 20. First, as seen in FIG. 5 for pad 40 (membrane 460 has been omitted for clarity), cushion layer 440 has a diameter 422 that is larger than pad cup inner edge diameter 230, allowing cushion layer 440 to overhang pad cup inner edge 534, enabling better coverage of tone hole 220. Second, backer 420 has a backer diameter 418 that is smaller than pad cup inner edge diameter 230, resulting in some clearance between pad 40 and pad cup 210. The clearance allows for adjustment (e.g., via tipping) of pad 40 relative to tone hole 220, and may be accomplished by "floating" pad 40 on a bed of pad adhesive 550 that liquefies upon heating.

If a traditional step-beveled pad as depicted in FIG. 4 and FIG. 5, is sized to overhang pad cup 210, several drawbacks exist. The first drawback, as can be seen with reference to FIG. 2 and FIG. 5, is that thickness 546 of cushion layer 440 must precisely match projection distance 242 between plane 234 and plane 246. If cushion layer 440 is too thick or too thin, pad 40 will contact tone hole 220 unevenly, causing unequal compression of cushion layer 440, with eventual consequent air leaks. The second drawback, as seen in FIG. 4, is that cushion layer outer edge portion 442 is not supported by backer 420 because there is no direct contact with backer 420. Hence when the pad 40 contacts a tone hole 220, cushion layer outer edge portion 442 has the potential to flex when pressure is applied to pad 40 to close the tone hole 220, which flexing can result in a poor seal. Additionally, step-beveled pad 40 as shown in FIG. 5, relies upon contact with pad cup bottom edge 536 to support cushion layer outer edge portion 442. As will be recognized by one skilled in the art, any error in installation can result in cushion layer outer edge portion 442 unsupported by pad cup bottom edge 536, resulting in a higher likelihood of air leakage when tone hole 220 is closed by pad 40.

SUMMARY OF THE INVENTION

To overcome the problems of prior art musical instrument pads, a new type of musical instrument pad has been developed, employing a backer having a contoured side wall. The new pad is easier than prior art designs to install and position relative to a corresponding tone hole, and more reliable in providing an air-tight seal to the tone hole.

The new pad can be made from any combination of pad materials such as cardboard, wool, felt, leather, bladder, various polymer foams, solid plastic, plastic film, wood products, and metal. In one embodiment of the invention, a pad can be made in a completely unitized fashion, whereby the backing, cushion layer, and sealing layer are securely bonded to each other by any combination of adhesive or laminating methods. In another embodiment of the invention, a pad can be constructed by assembling a backer and a cushion layer, and wrapping the assembly in one or more layers of an air-tight membrane, which is then glued in place. The membrane can be made of bladder, leather, or a polymer film.

A key feature of one embodiment of the invention is a backer having a sloping (also called "tapered" or "contoured" herein) side wall, a portion of which may have a curved contour (also called "rounded contour", or alternatively "radiused" or alternatively "radiused contour" herein).

According to an embodiment of the invention, wherein the pad contains a backer and a contact layer (the contact layer containing a sealing layer, and in addition, optionally a cushion layer), the backer is preferably sized so that the diameter of the backer inner surface is substantially the same as the diameter of the contact layer, providing support from the backer to the outermost edge of the contact layer. This design permits the advantageous use of a larger diameter pad than is possible with a non-beveled pad, and also enables easy leveling of the pad.

DETAILED DESCRIPTION OF THE INVENTION

Figure 1:
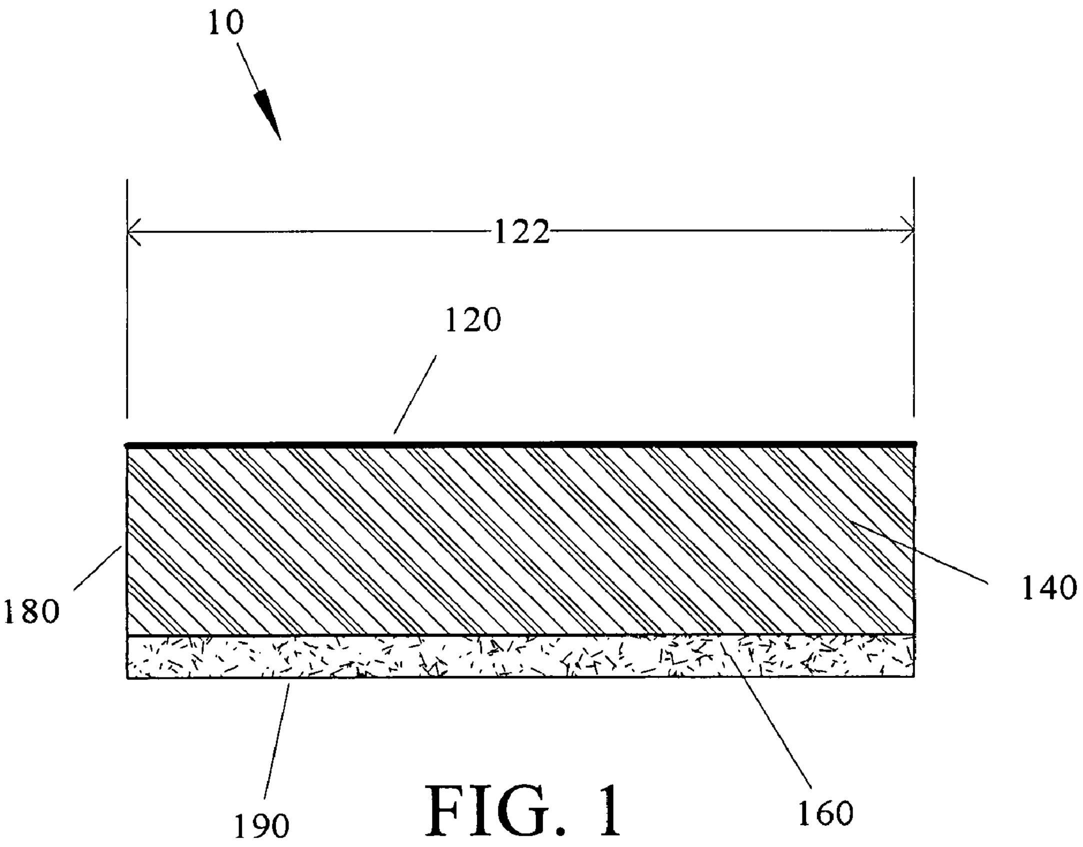
FIG. 1 (PRIOR ART)
FIG. 1 illustrates a prior art non-beveled pad.
Figure 2:
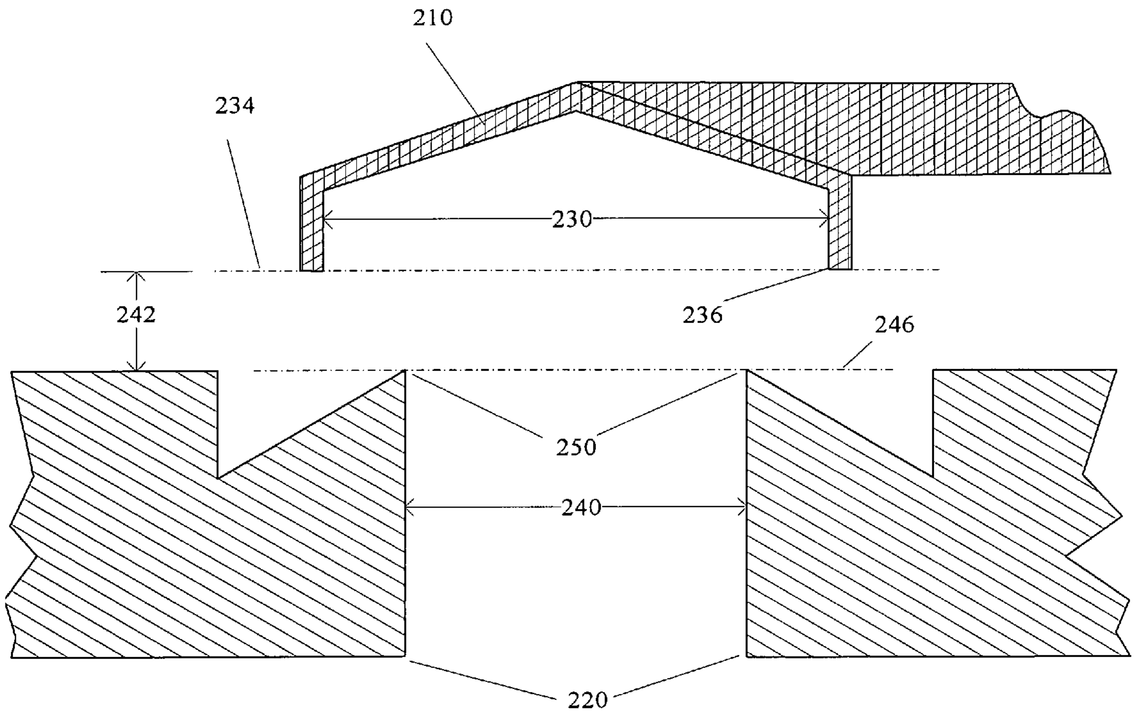
FIG. 2 (PRIOR ART)
FIG. 2 illustrates the geometry of a typical pad cup and its corresponding tone hole.
Figure 3:
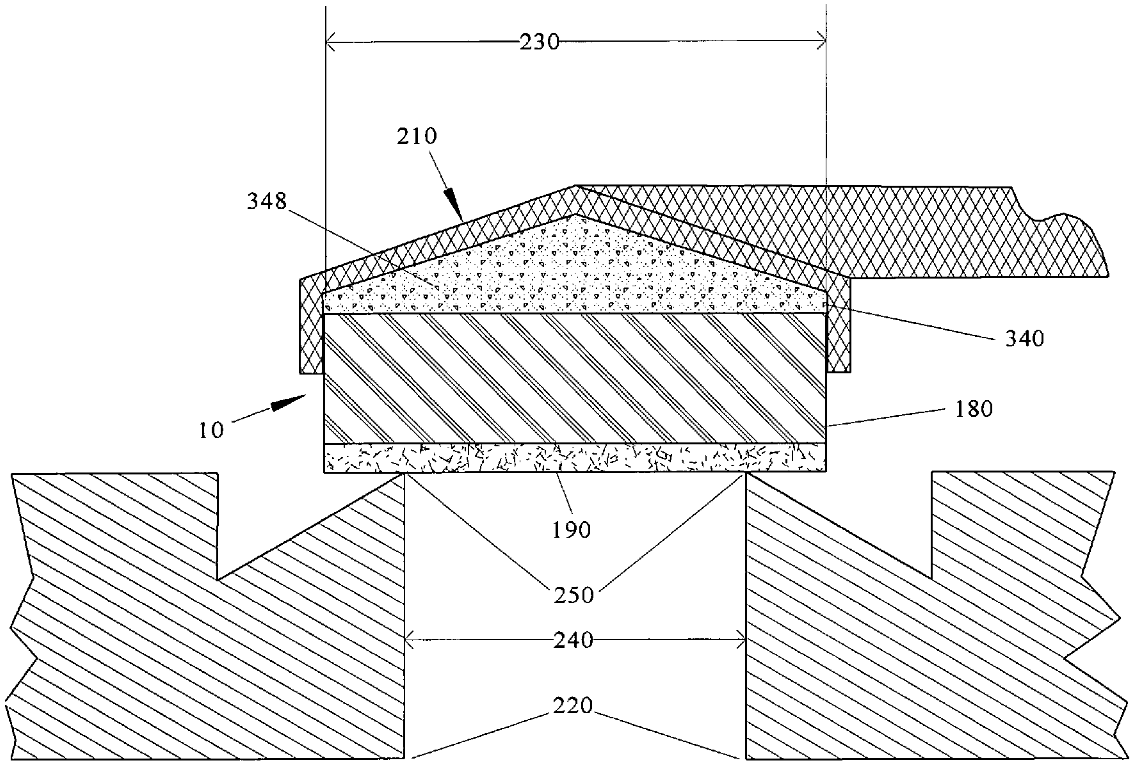
FIG. 3 (PRIOR ART)
FIG. 3 illustrates a pad cup and tone hole with a typical prior art non-beveled pad installed in the pad cup.
Figure 4:
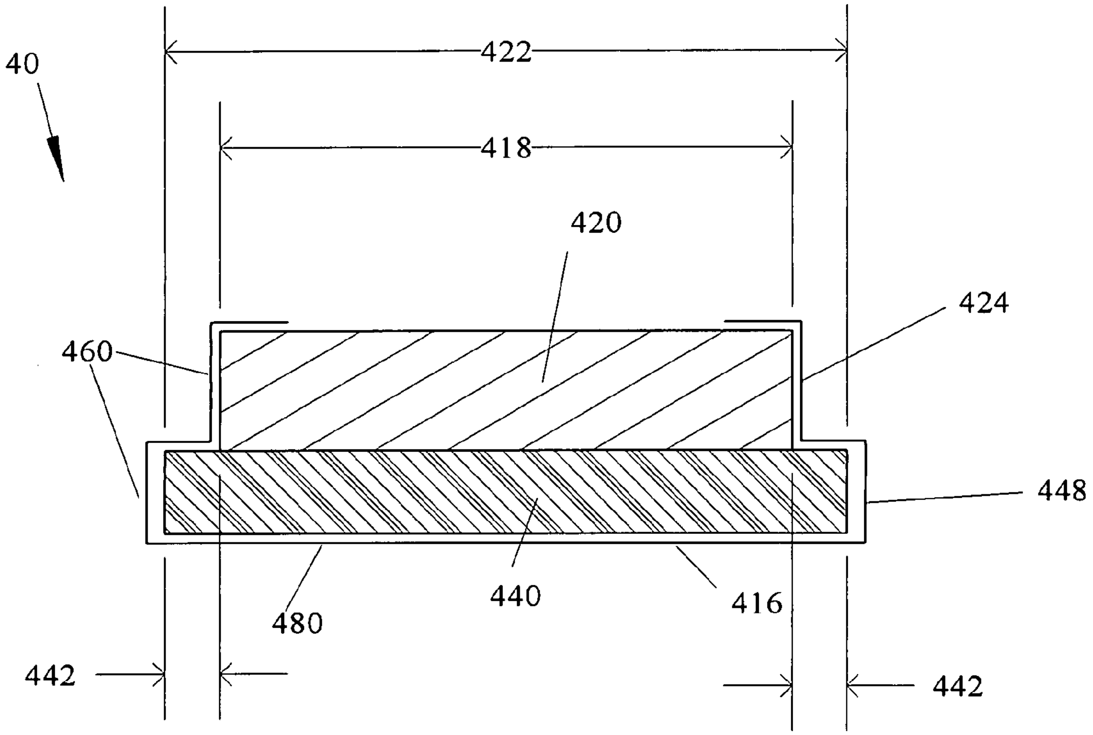
FIG. 4 (PRIOR ART)
FIG. 4 illustrates a prior art step-bevel pad containing a backer, a cushion layer, and a sealing membrane.
Figure 5:
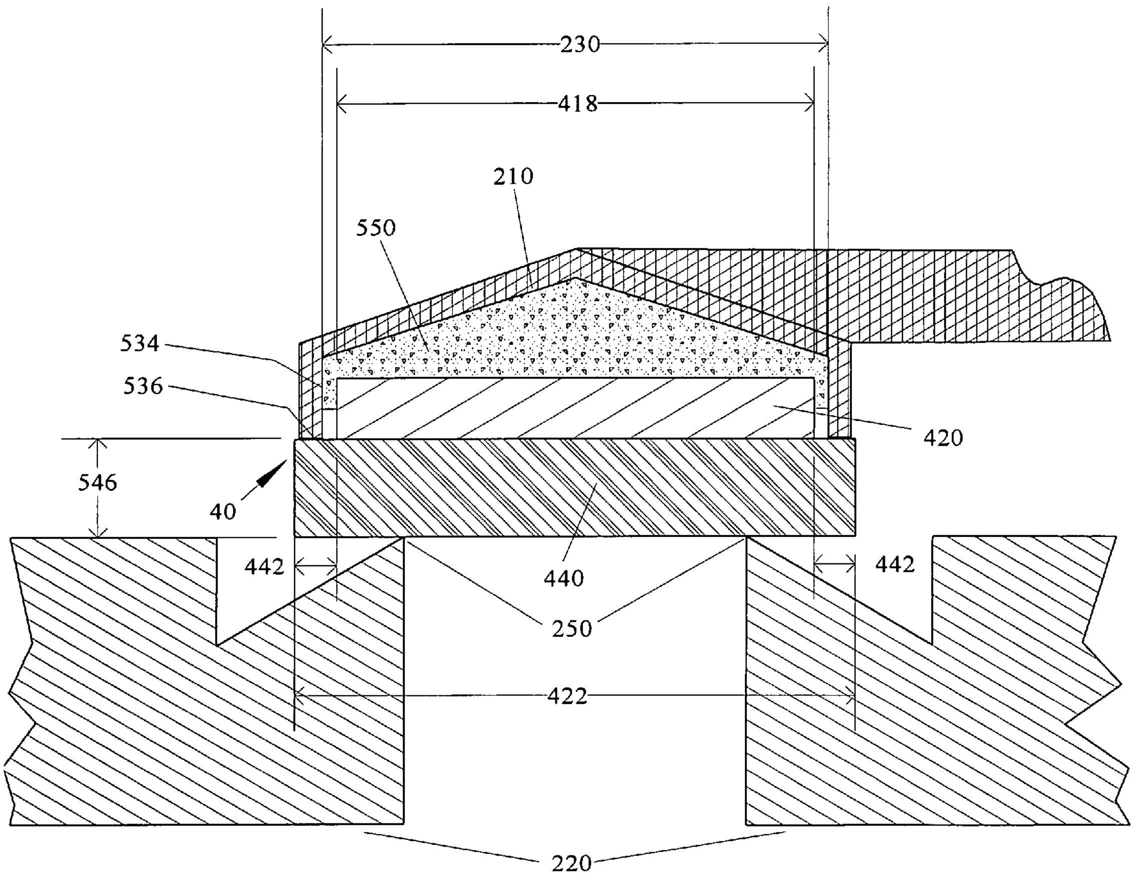
FIG. 5 (PRIOR ART)
FIG. 5 illustrates a pad cup and tone hole with a traditional step-bevel pad installed in the pad cup.
Figure 6A:
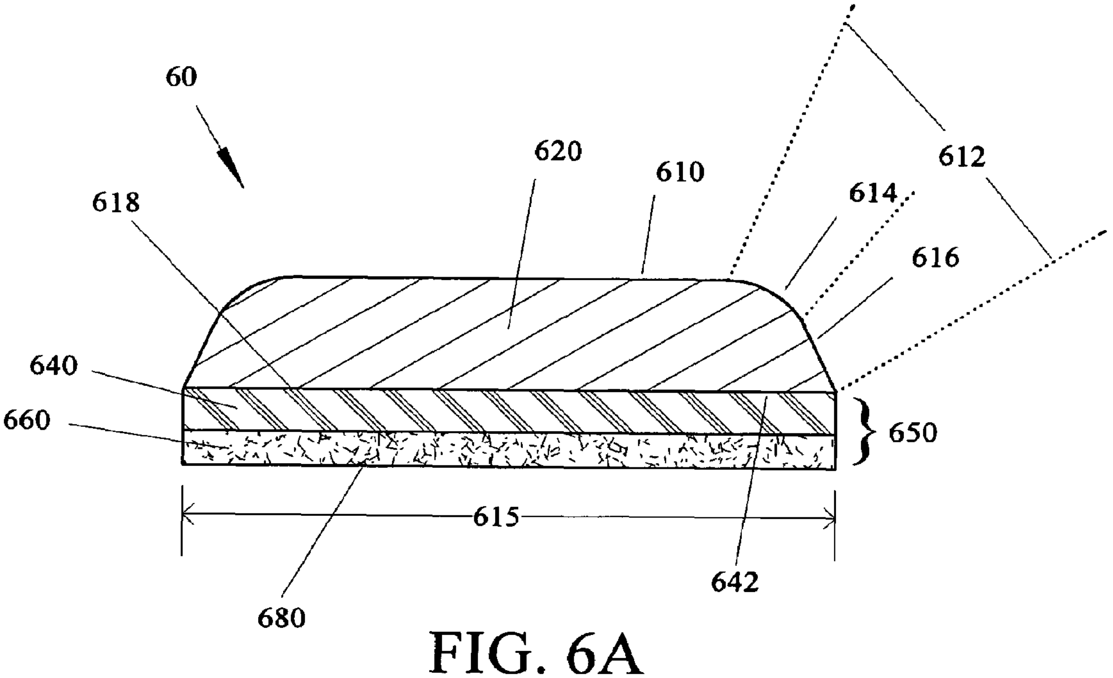
FIG. 6A-D illustrates, according to various embodiments of the invention, a pad with a backer having a sloping side wall, and a contact layer that contains both a cushion layer and a sealing layer.

For each of the figures described and illustrated herein, a cross-sectional view, at the respective midpoint of each of the objects being illustrated, is presented. FIG. 6A shows a beveled pad 60 according to an embodiment of the invention, with a backer [620 (also called "rigid backer" herein) containing a sloping side wall 612, and a contact layer 650 that contains cushion layer 640 and sealing layer 660. (A contact layer herein refers to the set of all layers residing between a backer inner surface and a sealing surface that will be contact with a tone hole plus the sealing surface itself. For instance, in FIG. 6A, cushion layer 640 and sealing layer 660 taken together, are referred to as contact layer 650.) Backer 620 is typically made from a material that is relatively rigid in comparison with material used to make cushion layer 640 or sealing layer 660. Backer inner surface 618 is preferably substantially planar, thereby providing substantially uniform support to all portions of cushion layer 640. Also, cushion layer 640 includes a corresponding substantially planar cushion layer surface 642 in contact with backer inner surface 618, enabling cushion layer 640 to receive uniform support from backer 620. (For each embodiment of the invention presented herein, a preferred embodiment includes both a planar backer inner surface and a corresponding planar contact layer surface with which the backer is in contact.)

For all embodiments of the invention described herein, a backer, e.g., backer 620, is preferably made of a sufficiently rigid material so that it provides adequate support to an adjoining contact layer, e.g., contact layer 650. Materials of suitable rigidity include materials with a tensile modulus of elasticity greater than or equal to approximately 20,000 PSI, and preferably at least 300,000 PSI. Materials such as cork, composition cork, and rubber cork, and other materials with tensile modulus typically in the range 200-1500 PSI, do not have sufficient rigidity to be usable in constructing a backer according to embodiments of the invention. Materials suitable for making a backer may include plastics such as LDPE and other such materials, having a modulus of elasticity in the range of approximately 25,000 PSI. Examples of preferred materials include, but are not limited to hard woods, most soft woods (e.g., pine, alder), cardboard, fiberboard, metals, plastics such as rigid (type 1) polyvinyl chloride (PVC), ceramics, glass, and various composite materials.

For all embodiments according to the invention described herein, a material used to make a backer, e.g., backer 620, is also preferably relatively unaffected by short-term heating though contact with molten adhesive. Materials that are relatively unaffected by short-term heating through contact with molten adhesive and hence are suitable for making a backer include, but are not limited to: hard woods, most soft woods (e.g., pine, alder), cardboard, fiberboard, metals, plastics such as rigid (type 1) polyvinyl chloride (PVC), ceramics, glass, and various composite materials.

Figure 6B:
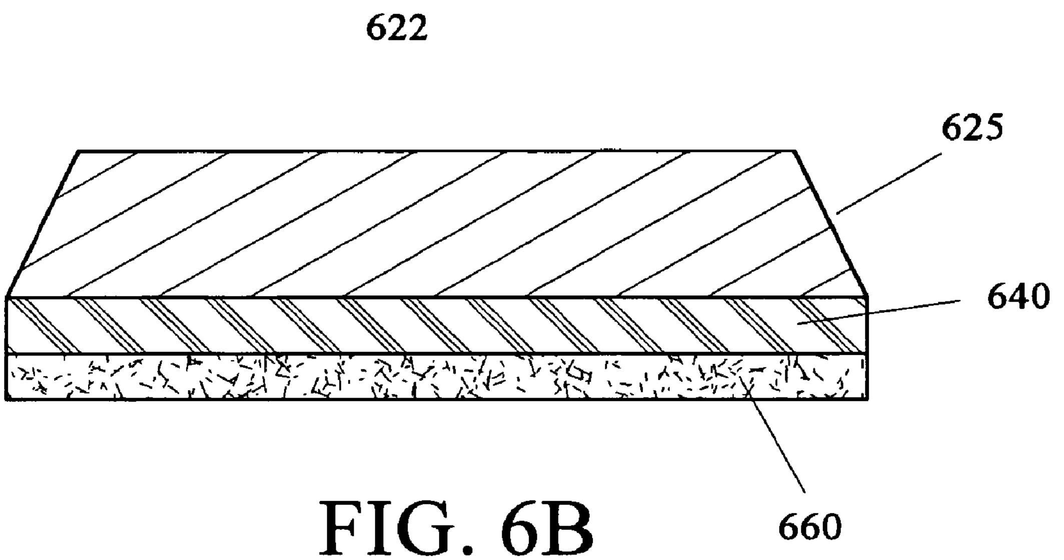
Figure 6C:
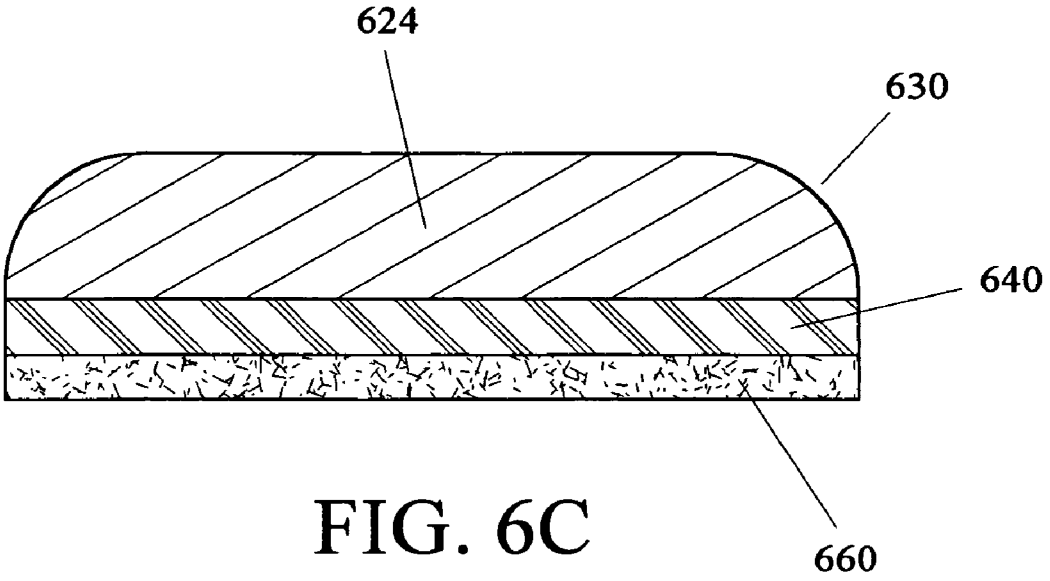
Figure 6D:
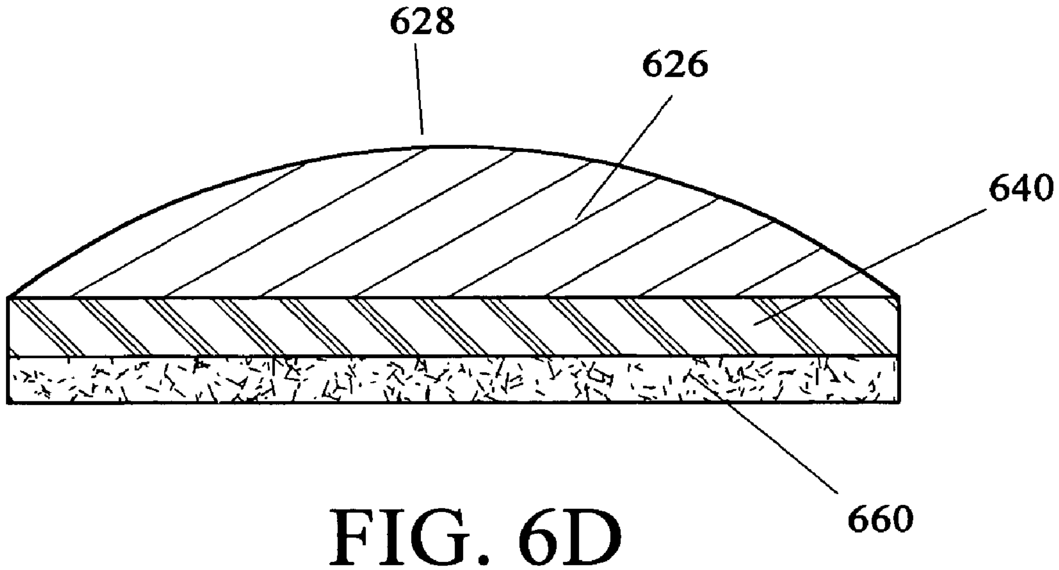

Beveled pad 60 can be made in a completely unitized fashion, whereby backer 620, cushion layer 640, and sealing layer 660 are securely bonded to each other by any combination of adhesive and/or laminating methods known by those skilled in the art. A preferred feature of this embodiment is a radiused portion 614 of the sloping side wall 612. Radiused (also "curved contour" herein) portion 614 begins at backer outside surface 610 and has a continuously curved contour to side wall portion 616. Side wall portion 616 has an approximately straight line i.e., linear, contour. Alternatively, for an embodiment of the invention shown in FIG. 6B, backer 622 has sloping side wall 625, which has an approximately straight line contour, and no curved contour portion. FIG. 6C illustrates an embodiment of the invention wherein side wall 630 has a curved contour, i.e., is radiused along the full extent of the side wall. FIG. 6D shows an embodiment of the invention in which backer 626 has a backer outer surface 628 that is contoured throughout its extent. In each of the embodiments 6 A-D, support is provided by the respective backer to all portions of the corresponding cushion layer 640 (i.e., to the outer extent of the corresponding cushion layer) that, in turn, supports sealing layer 660.

Figure 7:
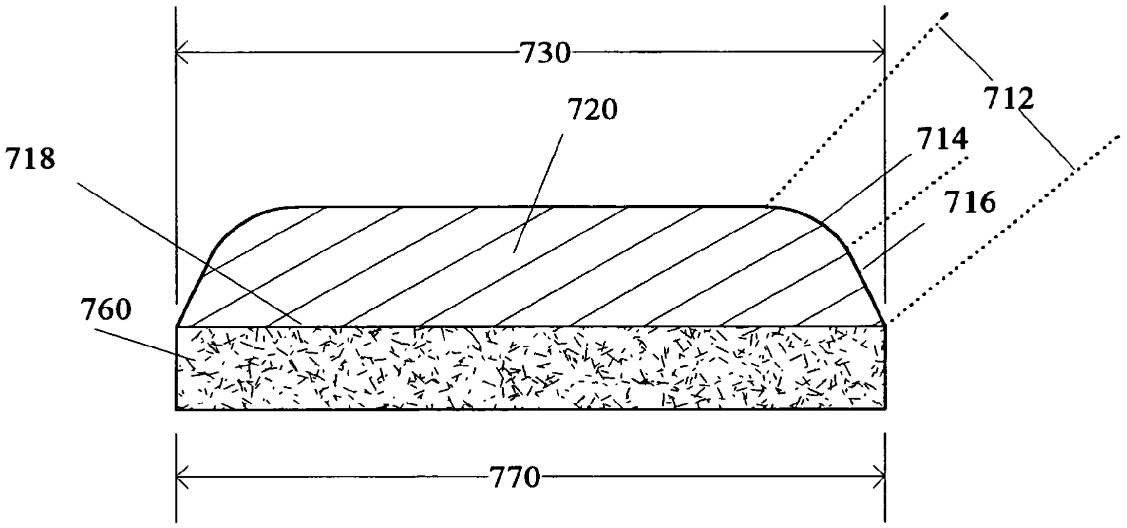
FIG. 7 illustrates a pad with a backer having a sloping side wall, and a contact layer containing one cushion/sealing layer, according to another embodiment of the invention.

FIG. 7 shows another embodiment of the invention, containing a backer 720 with a sloping side wall 712, and a single cushion/sealing layer 760 (which, for this embodiment, is the same as the pad contact layer). Side wall 712 contains a curved contour portion 714, in similar fashion to FIG. 6. Backer inner surface 718 is preferably planar, which serves to provide support to all portions of contact layer 760. Also, backer inner surface diameter 730 is preferably equal to cushion/sealing layer diameter 770, which serves to provide support to all portions of cushion/sealing layer 760. Other side wall profiles, in similar fashion to FIGS. 6 B-D, may be employed according to this embodiment, i.e. having a contact layer containing a single cushion/sealing layer.

Figure 8:
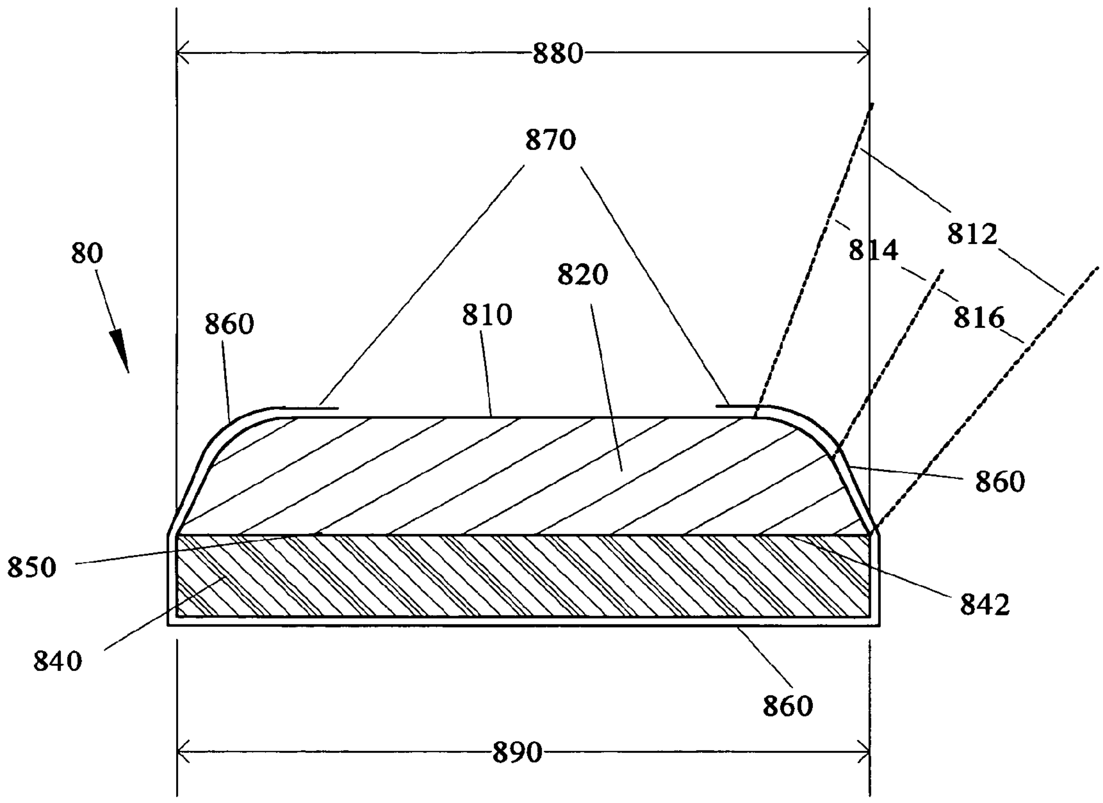
FIG. 8 illustrates a pad with backer having a sloping side wall, and a contact layer containing a cushion layer and a sealing membrane, according to another embodiment of the invention.

FIG. 8 shows another embodiment 80 according to the invention, which is constructed by assembling backer 820 and cushion layer 840, wrapping backer 820 and cushion layer 840 in one or more air-tight membrane layers 860, and gluing membrane edges 870 to backer outer surface 810. Membrane layer 860 acts as a sealing layer when in contact with a tone hole (not shown). Membrane layer 860 may be made of materials including but not limited to bladder, leather, or various polymer films. Backer inner surface 850 is preferably planar, providing support to all portions of cushion layer 840. Cushion layer inner surface 842 is preferably planar, thereby receiving support from all portions of backer 820. Backer inner surface diameter 880 is typically substantially equal to cushion layer diameter 890, which serves to provide support for all portions of cushion layer 840. Backer 820 features a sloping side wall 812 that includes a curved contour portion 814 and a linear sloping portion 816, promoting ease of leveling of pad 80 within a pad cup (not shown).

Figure 9A:
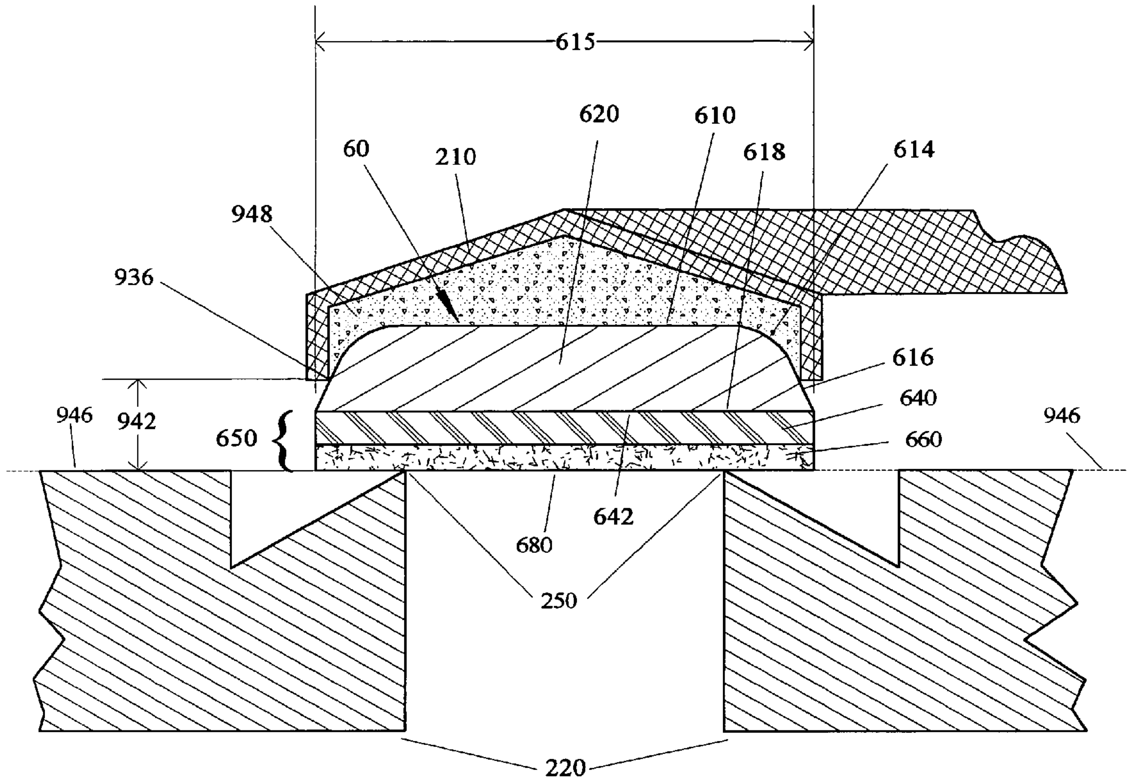
FIG. 9A,B illustrates a pad cup and tone hole with a beveled pad installed, the beveled pad featuring a backer having a sloping side wall, according to an embodiment of the invention.

FIG. 9A illustrates pad 60 of FIG. 6A installed in a pad cup 210, according to an embodiment of the invention. At installation, side wall 616 contacts pad cup bottom inside edge 936. This contact provides several advantages: 1) pad 60 cannot sink too deeply into molten pad adhesive 948 within pad cup 210, which would result in pad 60 being too far from tone hole 220 for proper leveling to occur; 2) contact between pad cup bottom inside edge 936, and side wall 616 serves to center pad 60 relative to the pad cup 210. Pad 60 is therefore constrained in translational movement, and the only remaining possible motion of the pad is rotational, i.e., tipping; 3) small errors in overall thickness of the pad can be compensated for by tipping the pad, enabling a positive seal to be established when sealing surface 680 contacts tone hole 220. With this embodiment, if pad cup 210 is slightly out of parallel with tone hole edge 250 when pad 60 is initially brought into contact with tone hole 220 through activation of a key mechanism (not shown), orientation of sealing surface 680 can be adjusted through tipping of pad 60 within pad cup 210 while adhesive 948 is heated to a molten state. Adhesive 948 is then allowed to cool and solidify, thus fixing pad 60 relative to pad cup 210. This adjustment of pad orientation through tipping can compensate for a small misalignment of pad cup 210 relative to tone hole 220.

As shown in FIG. 9A, backer 620 allows for construction of a pad with a sealing surface 680 of sealing surface diameter 615 that is larger than would be possible using a non-beveled pad, because backer 620 projects partially into distance 942 between pad cup inside bottom edge 936 and tone hole edge 250. Unlike prior art step-beveled pads, backer 620, with backer inner surface 618 extending to diameter 615 of contact layer 650, supports the entirety of contact layer 650. Backer 620, preferably constructed of a rigid material, completely supports cushion layer 640 (which in turn supports sealing layer 660), regardless of angular orientation of pad 60 relative to pad cup 210. This support allows for installation of a larger diameter pad than a non-beveled pad, without incurring stability problems of an unsupported cushion layer typically experienced when employing a traditional step-beveled pad. Backer 620 with curved contour 614 and sloping side wall 616, further promotes ease of tipping to achieve leveling of pad 60 relative to plane 946, which plane is defined by tone hole edge 250. Backer inner surface 618 is preferably planar, thereby providing substantially uniform support to all portions of the contact layer 650. In similar fashion, contact layer inner surface 642 is preferably planar, enabling substantially uniform support to be received by all portions of contact layer 650 from backer 620. (For each of the subsequent embodiments of the invention presented, backer inner surface and contact layer inner surface are both preferably planar.)

Figure 9B:
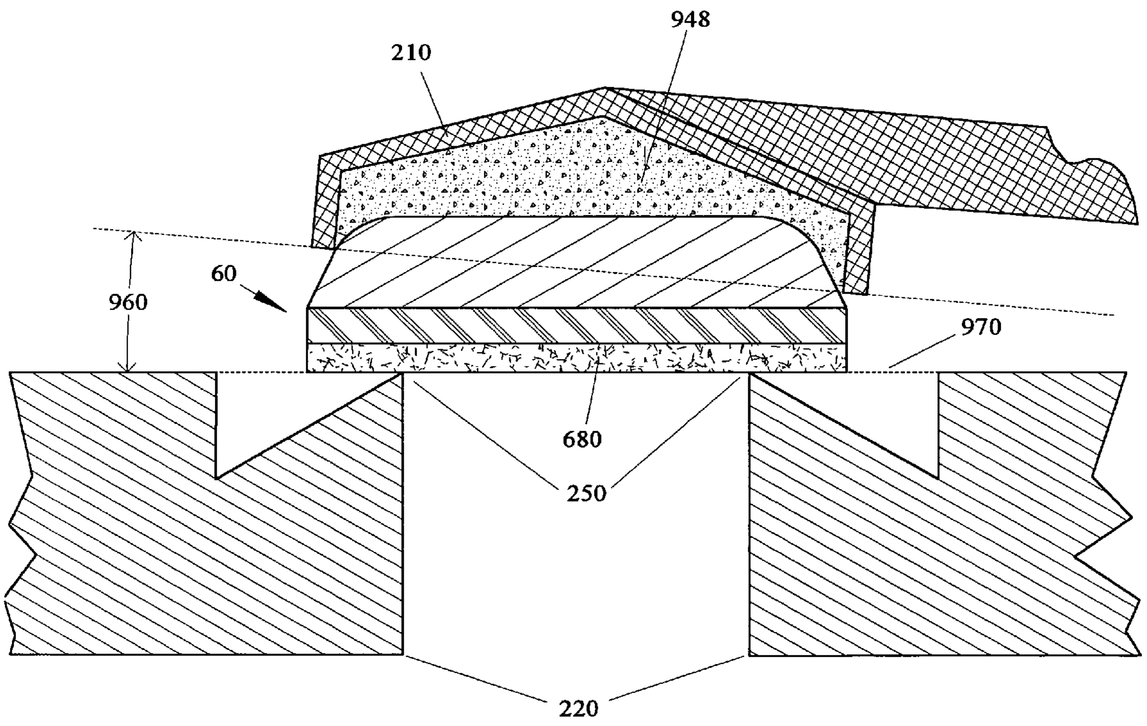

FIG. 9B illustrates that the beveled pad 60 may be tipped to compensate for a misaligned pad cup 210 relative to its corresponding tone hole 220. Pad cup 210 is misaligned with respect to tone hole edge 250, situated at an angle 960 with respect to a plane 970 defined by tone hole edge 250. Pad 60 is adjusted by tipping, in order to render sealing surface 680 level with respect to a plane 970, enabling sealing surface 680 to make an air-tight seal with tone hole edge 250. The process of leveling pad 60 is typically accomplished by melting adhesive 948 by heating pad cup 210, and then adjusting the orientation of pad 60 by sliding pad 60 while maintaining contact with pad cup pad cup bottom inside edge 936, thus changing pad orientation with respect to tone hole 220.

Backer 620 is preferably made of a sufficiently rigid material so as to enable adjustment, by sliding pad 60 while maintaining firm contact, throughout the adjustment, with pad cup bottom inside edge 936, which edge is circular. The backer 620 should be of sufficient rigidity so that, during adjustment, backer 620 will slide on pad cup bottom inside edge 936 in a smooth fashion with low force required to change orientation.

Various techniques, e.g. use of a leak light, or use of thin feeler gauges, enable a person skilled in the art to determine if pad 60 is level with respect to tone hole 220. When adhesive 948 is permitted to cool and solidify, pad 60 is rendered invariant in position with respect to pad cup 210, thereby fixing the pad orientation. To achieve leveling of pad 60, adhesive 948 may need to be heated, an adjustment of pad orientation made, adhesive 948 cooled, pad 60 tested for air leakage, and these steps repeated until no leakage is detected.

Alternatively, according to an embodiment of the invention, a pad of a smaller diameter may be installed, fitting entirely within a pad cup inside diameter. One skilled in the art may choose to use a smaller diameter pad for various acoustical and/or air venting reasons, so long as the diameter of the respective tone hole is small enough to permit use of a smaller diameter pad. A pad according to an embodiment of the invention, even when fitting entirely within the cup, has advantages as follows: 1) the sloping side wall (and optionally curved contour portion) of the beveled backer provides more clearance with the inside of the pad cup, facilitating ease of leveling; 2) due to the rigidity of the material used to construct the backer, a pad according to an embodiment of the invention is highly dimensionally stable, and 3) the backer, when constructed from preferred materials, is more resistant to heat from pad adhesives than are prior art synthetic pads. Beveled pads with a sloping side wall, employing a sealing layer made from a traditional material such as, bladder, leather, or various plastic films, can also fit entirely inside a pad cup.

By controlling backer thickness, the angle of taper (i.e., slope of side wall) of the backer, and the thickness of the cushion layer, pads according to embodiments of the invention can be made to fit virtually any pad cup and tone hole combination. According to another embodiment (not shown), variations can include provisions for integral or attached resonators, either by incorporating a resonating surface into the backer or by attaching a resonator to the pad with adhesive, rivets, screws, or other means. Resonators, their purpose, use, and installation are well known to those of ordinary skill in the art, and their details will not be described in this application further.

Figure 10:
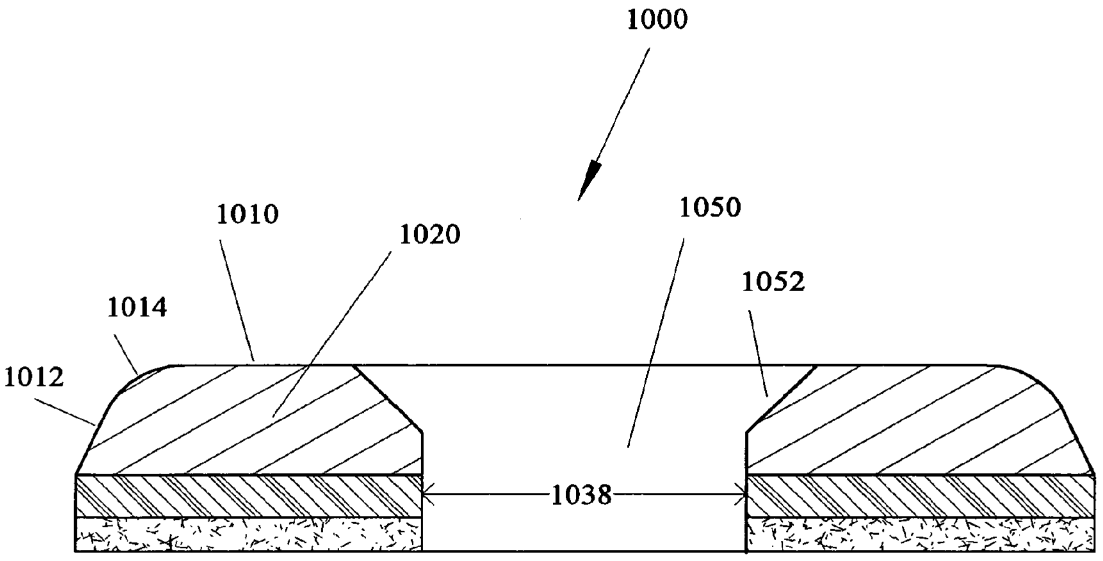
FIG. 10 illustrates a beveled aperture pad, with a center hole through the pad for venting and/or attachment purposes, according to an embodiment of the invention.

FIG. 10 shows an embodiment of the invention suitable for a key having either a center mounting spud, or a hole in the center of the key for air venting. In this center aperture beveled pad 1000, constant slope taper 1012 and radiused contour 1014 are seen on the outside portion of the pad, and additional clearance for mounting is provided by a chamfer 1052 on backer 1020, extending from backer outer face 1010 to aperture 1050.

Figure 11A:
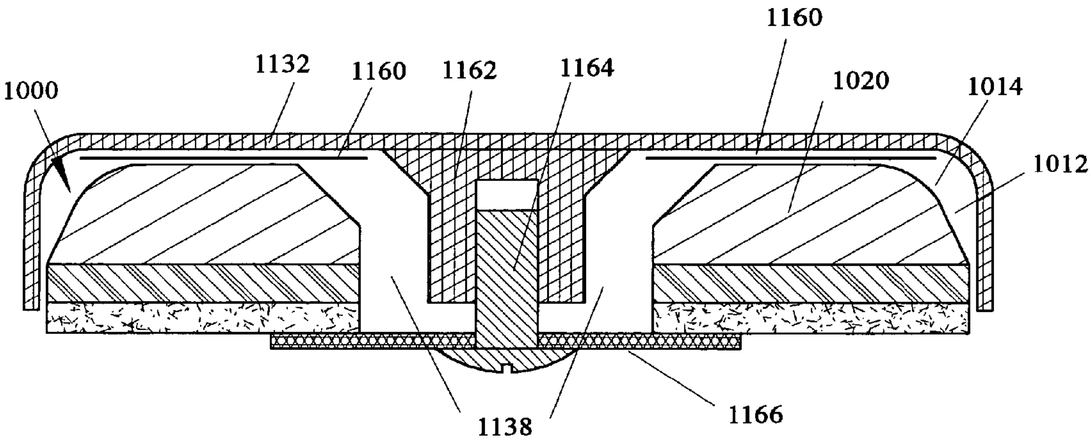
FIG. 11A,B illustrates a closed-hole pad cup with a beveled aperture pad installed, according to an embodiment of the invention.
Figure 12:
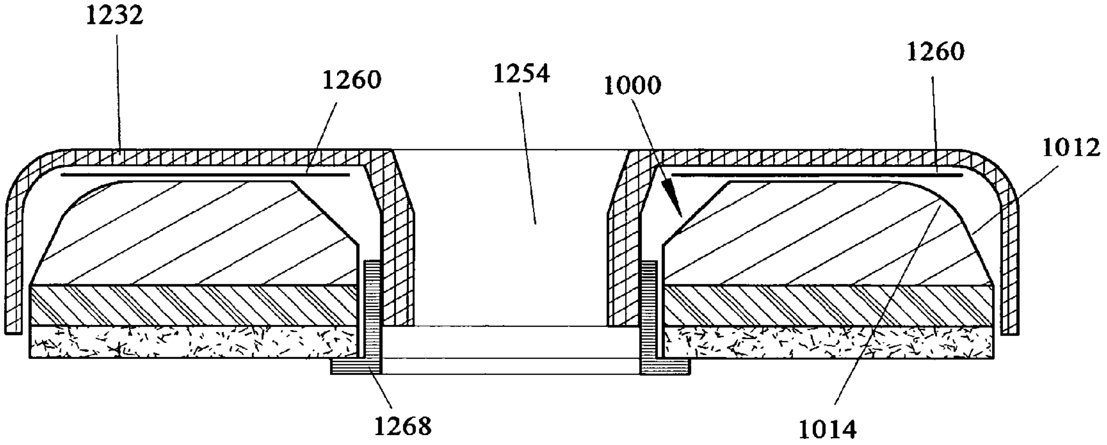
FIG. 12 illustrates an open-hole aperture pad cup with a beveled aperture pad installed, according to an embodiment of the invention.
Figure 13:
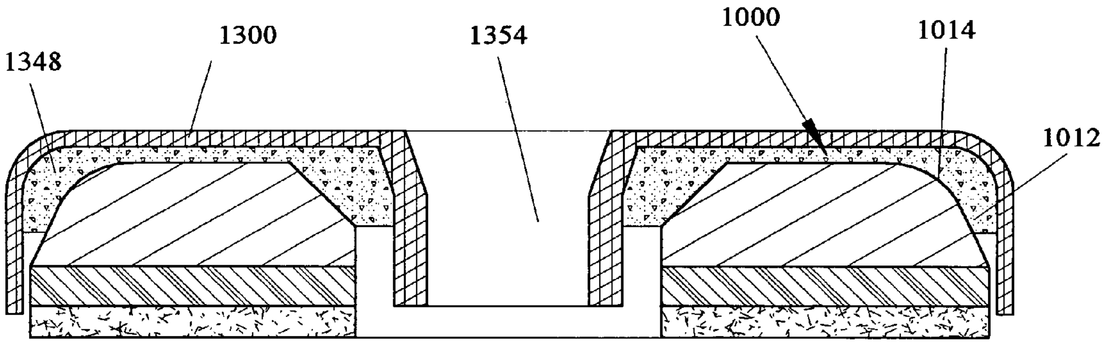
FIG. 13 illustrates another aperture pad cup with a beveled aperture pad installed, according to an embodiment of the invention.

Beveled center aperture pad 1000 may be installed in a pad cup by situating sloping side wall portion 1012 so as to rest on an inside bottom edge of a pad cup (such as inside bottom edge 936 shown in FIG. 9A). Alternatively, a center aperture pad 1000 may be installed completely within a pad cup. FIGS. 11A, 12, 13 within this document depict an aperture pad situated completely within a pad cup; however, placement wholly within a pad cup, or partially within a pad cup and with sealing layer extending beyond the outside diameter of a pad cup (as shown in FIG. 11B), may be employed.

FIG. 11A shows a beveled center aperture pad 1000 installed into a pad cup 1132 by use of pad screw 1164 and pad washer 1166. The type of key system depicted is called Plateau or Closed Hole Cup. Alternative attachment hardware, such as plastic snaps (not shown), may be used, and are well known to those skilled in the art. For this type of pad cup 1132, a central raised section with internal threads, called a "pad cup spud" 1162, is provided. Pad cup spud 1162 is typically soldered to pad cup 1132, and provides a mechanical attachment point for pad screw 1164 and pad washer 1166. Beveled central aperture pad 1000 provides a central aperture 1138 for mechanical attachment to pad cup 1132. Adjustment of pad height and tipping is typically accomplished by placing one or more pad shims 1160 between backer 1020 and pad cup 1132. Clearance between pad 1000 and pad cup 1132 is provided by sloping side wall portion 1012 and radiused contour 1014, facilitating tipping of pad 1000 within pad cup 1132 to achieve leveling with respect to a corresponding tone hole (not shown).

Figure 11B:
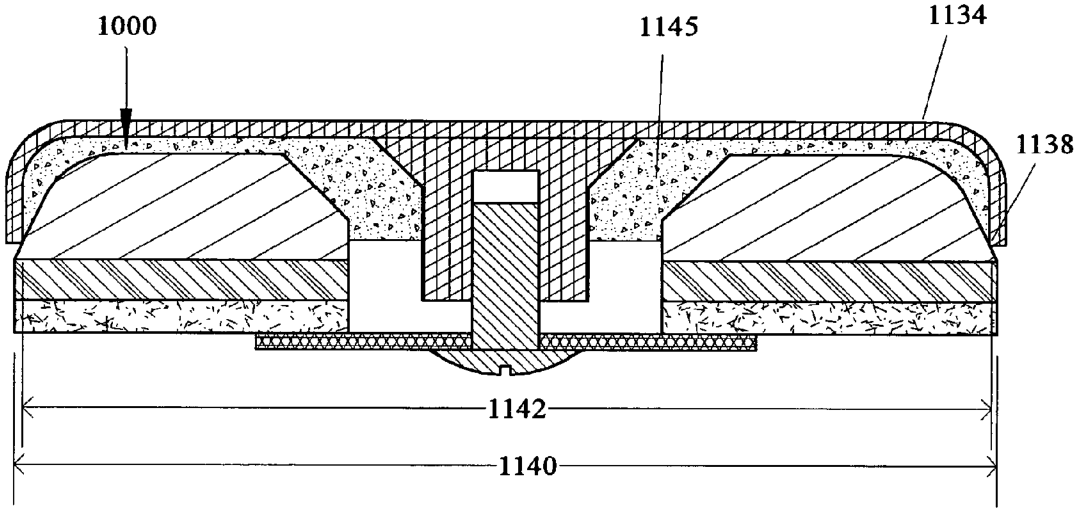

FIG. 11B shows a beveled center aperture pad 1000 installed into a pad cup 1134. Here the beveled center aperture pad 1000 is oversized, i.e., it has a contact layer diameter 1140 that exceeds key cup inner diameter 1142. Beveled center aperture pad 1000 is supported by contact with pad cup inside edge 1138, providing stability and preventing pad 1000 from tilting when contacting and closing a corresponding tone hole. Adhesive 1145 is optional, providing additional support, and further stabilizing the position of beveled center aperture pad 1000. If adhesive 1145 is present, leveling is accomplished by heating adhesive 1145 to a molten state, orienting pad 1000, and then allowing adhesive 1145 to cool and solidify.

FIG. 12 shows pad cup 1232 containing a beveled central aperture pad 1000 featuring sloping side wall 1012 and optionally, a curved contour portion 1014, according to an embodiment of the invention. Central aperture 1254 in pad cup 1232 allows for air venting through the center of pad cup 1232. This type of pad cup design is called a French (or Open Hole) Cup, typically seen in flutes. Typically one or more pad shims 1260 is employed for height and tipping adjustment of beveled central aperture pad 1000. Fastening is accomplished through use of a grommet 1268. Grommet 1268 is installed into pad cup 1232 by a gentle press-fit. Grommet 1268, in turn, holds pad 1000 in place by friction fit. Clearance between pad 1000 and pad cup 1232 is provided by sloping side wall portion 1012 and optional radiused contour 1014, facilitating tipping of pad 1000 within pad cup 1232 to achieve leveling with respect to a corresponding tone hole (not shown).

FIG. 13 shows another pad cup 1300 employing a beveled aperture pad 1000 with sloping side wall 1012 and optionally, a radiused contour 1014, according to an embodiment of the invention. Here pad cup 1300 has a central aperture 1354. Pad installation is typically accomplished through the use of pad adhesive 1348. The beveled pad 1000 as shown in FIGS. 11A, 11B, 12, and 13 may be made in unitized fashion, whereby backing, cushion, and sealing layers are securely bonded to each other by any combination of adhesive and laminating methods. Alternatively, beveled pad 1000 can be made by positioning a rigid backer with a sloping side wall (and optionally, a radiused contour side wall portion), against a cushion layer, wrapping backer and cushion layer with a sealing membrane such as bladder, leather, or a plastic film, and attaching the sealing membrane to the backer outer surface, i.e., the surface of the backer closest to the pad cup when the pad is installed.

Occasionally there are pad cup and tone hole combinations for which the sloping side wall beveled pad as depicted in FIG. 6A-D, cannot be made large enough in diameter to properly seal the hole, e.g., where the diameter of the tone hole is very large relative to the corresponding pad cup, In this case, a step-bevel pad, according to another embodiment of the invention, is needed to seal the corresponding tone hole.

Figure 14:
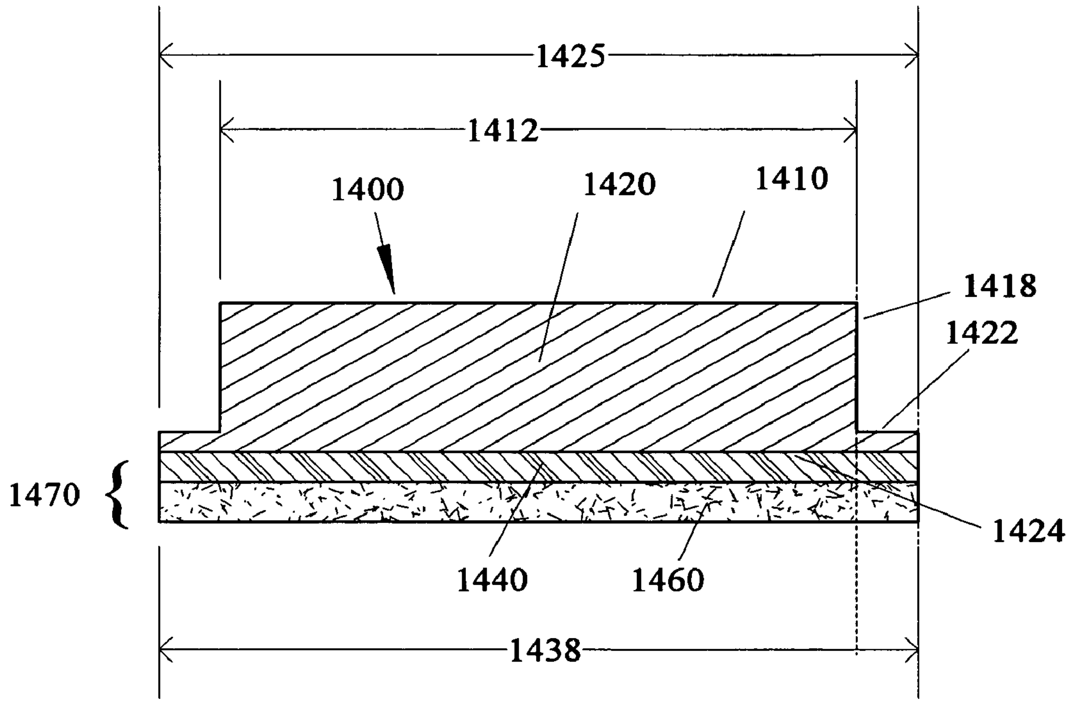
FIG. 14 illustrates another embodiment of the invention having a step-bevel backer, with a contact layer that contains a cushion layer and sealing layer.

FIG. 14 shows a step-bevel pad 1400 according to an embodiment of the invention. Backer 1420 is not die cut with straight sides of a single diameter, but instead has a step profile. Backer outer face 1410 has a backer outer face diameter 1412, which is smaller than backer inner face diameter 1425. Side wall portion 1418, shown in FIG. 14 to be vertical, is optionally vertical or tapered. Backer step 1422 extends backer 1420 to the full extent of cushion layer 1440. Backer inner face 1424 matches cushion layer diameter 1438 of cushion layer 1440. When step-bevel pad 1400 is installed in a pad cup, backer step 1422 typically projects beyond the outer edge of the pad cup (not shown).

Backer 1420 provides rigid support to all portions of cushion layer 1440. Cushion layer 1440, in turn supports sealing layer 1460. The support from backer step 1422 to contact layer 1470 promotes flatness, and hence effectiveness, of pad 1400 over time.

Figure 15:
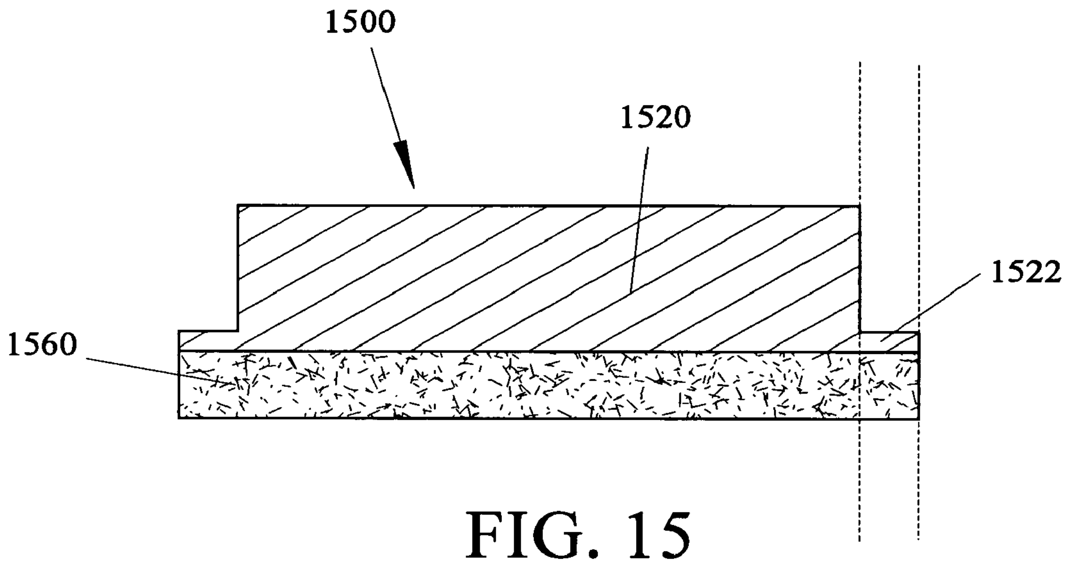
FIG. 15 illustrates another embodiment of the invention with a step-bevel backer and a contact layer containing a single cushion/sealing layer.

FIG. 15 illustrates step-bevel pad 1500 according to another embodiment of the invention, where contact layer 1560 is a single layer, serving as both a cushion layer and a sealing layer. In similar fashion to pad 1400 of FIG. 14, backer step 1522, which is a portion of backer 1520, provides rigid support for contact layer 1560, enhancing flatness of the pad, thus promoting, over time, an air-tight seal with a corresponding tone hole.

Figure 16:
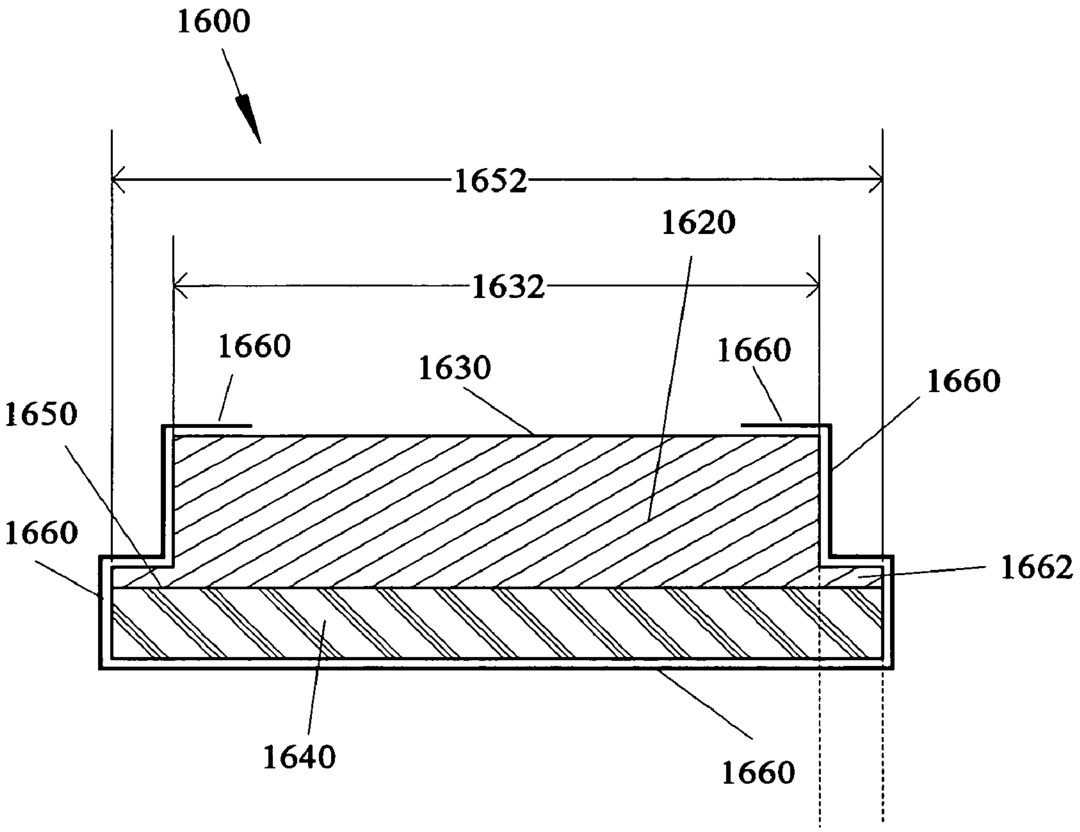
FIG. 16 illustrates another embodiment of the invention with step-bevel backer, and a contact layer containing a cushion layer and a sealing membrane.

FIG. 16 shows a step-bevel pad 1600 according to yet another embodiment of the invention, which includes a step-bevel backer 1620, with backer inner surface 1650 having backer inner face diameter 1652 that is larger than backer outer surface diameter 1632. Backer inner face 1650 is situated adjacent to a cushion layer 1640. Backer 1620 and cushion layer 1640 are wrapped within a sealing membrane 1660 made from, e.g., bladder, leather, or a plastic film. Sealing membrane 1660 is typically attached to backer 1620 at backer outer face 1630. In similar fashion to the embodiments depicted in FIGS. 14 and 15, backer step 1662 provides rigid support to all portions of cushion layer 1640, which in turn provides extended radial support to sealing membrane 1660, helping to ensure over time, an air-tight seal with a corresponding tone hole (not shown).

Figure 17:
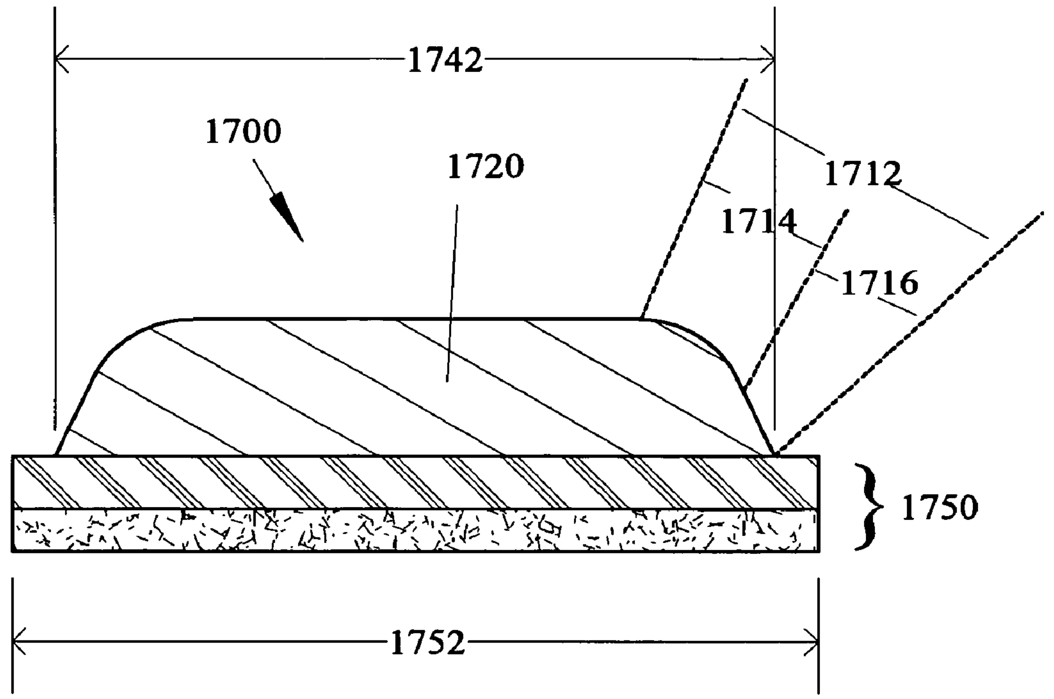
FIG. 17 illustrates a pad containing a backer having a sloped side wall that has a radiused portion, according to an embodiment of the invention.

FIG. 17 shows a beveled pad 1700 according to another embodiment of the invention. Backer 1720 contains a sloping side wall 1712, of which portion 1714 has a curved contour, i.e., radiused, and portion 1716 has a constant slope, i.e. straight line profile. In this embodiment, backer inner face diameter 1742 is smaller than contact layer diameter 1752 of contact layer 1750. In similar fashion to FIGS. 9A,B, sloping side wall 1712 enhances ease of leveling of pad 1700 relative to a corresponding tone hole edge (not shown).

Figure 18:
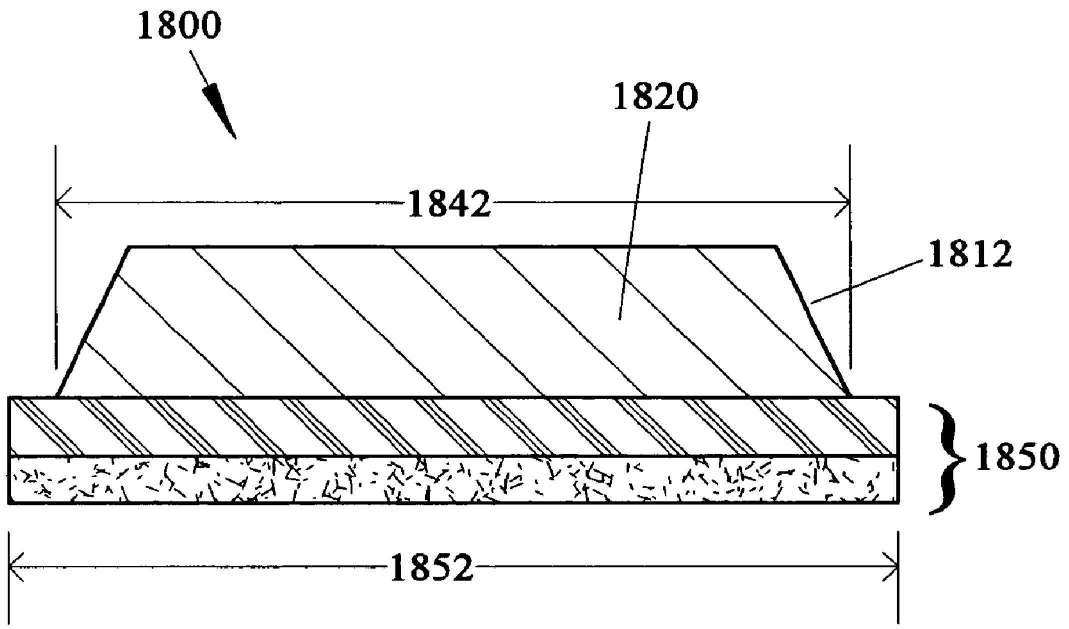
FIG. 18 illustrates a pad containing a backer having a sloped side wall, according to another embodiment of the invention.

FIG. 18 shows a beveled pad 1800 according to another embodiment of the invention. Backer 1820 includes sloping side wall 1812, which has a straight line profile. Backer inner face diameter 1842 is smaller than contact layer diameter 1852 of contact layer 1850. Sloping side wall 1812 enhances ease of leveling of pad 1800 relative to a corresponding tone hole edge (not shown).

Although the invention has been described above with reference to specific embodiments, persons skilled in the art will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A pad adapted to close a tone hole of a musical instrument, the pad comprising:
- a backer having a backer outer radial extent and a backer thickness, the backer having a backer inner face and a backer outer face, the backer comprising a rigid material defining a backer side wall, the backer side wall including sloping side wall portion; and
- a contact layer situated adjacent to the backer, the contact layer having a contact layer outer radial extent and a contact layer thickness, the contact layer having a contact layer inner face and a contact layer outer face;
- wherein the contact layer inner face is directly bonded to the backer inner face at a plane of contact between the contact layer and the backer;
- wherein the backer outer radial extent and the contact layer outer radial extent extend substantially to an outer most radial extent of the pad;
- wherein no portion of the contact layer extends towards the backer outer face beyond the plane of contact between the contact layer inner face and the backer inner face;
- wherein the contact layer is adapted to seal a tone hole upon contacting the tone hole.

2. The pad of claim 1, wherein the backer sloping side wall portion includes a combination of curved and straight line contours.

3. The pad of claim 1, wherein the backer sloping side wall portion defines a curved contour that comprises substantially an entirety of the backer side wall.

4. The pad of claim 1, wherein the backer side wall is adapted to facilitate sliding contact between the backer and a pad cup.

5. The pad of claim 1, wherein the contact layer comprises a combination of a cushion layer and a sealing layer;
- wherein the cushion layer directly bonded to the sealing layer.

6. The pad of claim 1, wherein the contact layer comprises one layer of a single material that functions both as a cushion layer and as a sealing layer.

7. The pad of claim 1, wherein the contact layer comprises a combination of any number of cushion layers and sealing layers;
- wherein the cushion layers are bonded to the sealing layers.

8. The pad of claim 1, wherein the pad defines a central aperature.

9. The pad of claim 8, wherein the backer sloping side wall portion includes a combination of curved and straight line contours.

10. The pad of claim 8, wherein the backer sloping side wall portion defines a curved contour that comprises substantially an entirety of the backer side wall.

11. The pad of claim 8, wherein the backer side wall is adapted to facilitate sliding contact the backer and a pad cup.

12. The pad of claim 8, wherein the contact layer comprises a combination of a cushion layer and a sealing layer;
- wherein the cushion layer is directly bonded to the sealing layer.

13. The pad of claim 8, wherein the contact layer comprises one layer of a single material that functions both as a cushion layer and as a sealing layer.

14. The pad of claim 8, wherein the contact layer comprises a combination of any number of cushion layers and sealing layers;
- wherein the cushion layers are bonded to the sealing layers.

15. A method of leveling a pad in a pad cup the method comprising:
- placing a beveled pad in a pad cup, the beveled pad comprising:
- a contact layer;
- a backer, the backer having a backer outer radial extent, the backer comprising a rigid material defining a backer side wall, the backer side wall including a sloping side wall portion, the sloping side wall portion extending to the backer outer radial extent;
- adjusting a relative position of the beveled pad and the pad cup while maintaining sliding contact between the backer and the pad cup so that, upon actuating a mechanism that results in contact between the beveled pad and a tone hole edge of a tone hole, substantially all portions of the tone hole contact the act layer;
- and fixing relative positions of the beveled pad and the pad cup.

16. The method of claim 15, wherein the backer sloping side wall portion defines a curved contour that comprises substantially an entirety of the backer side wall.

17. The method of claim 15, wherein the backer sloping side wall portion includes a combination of curved and straight line contours.

* * * * *